This invention relates to partial ester compositions, and more particularly, to monoglyceride-containing compositions.

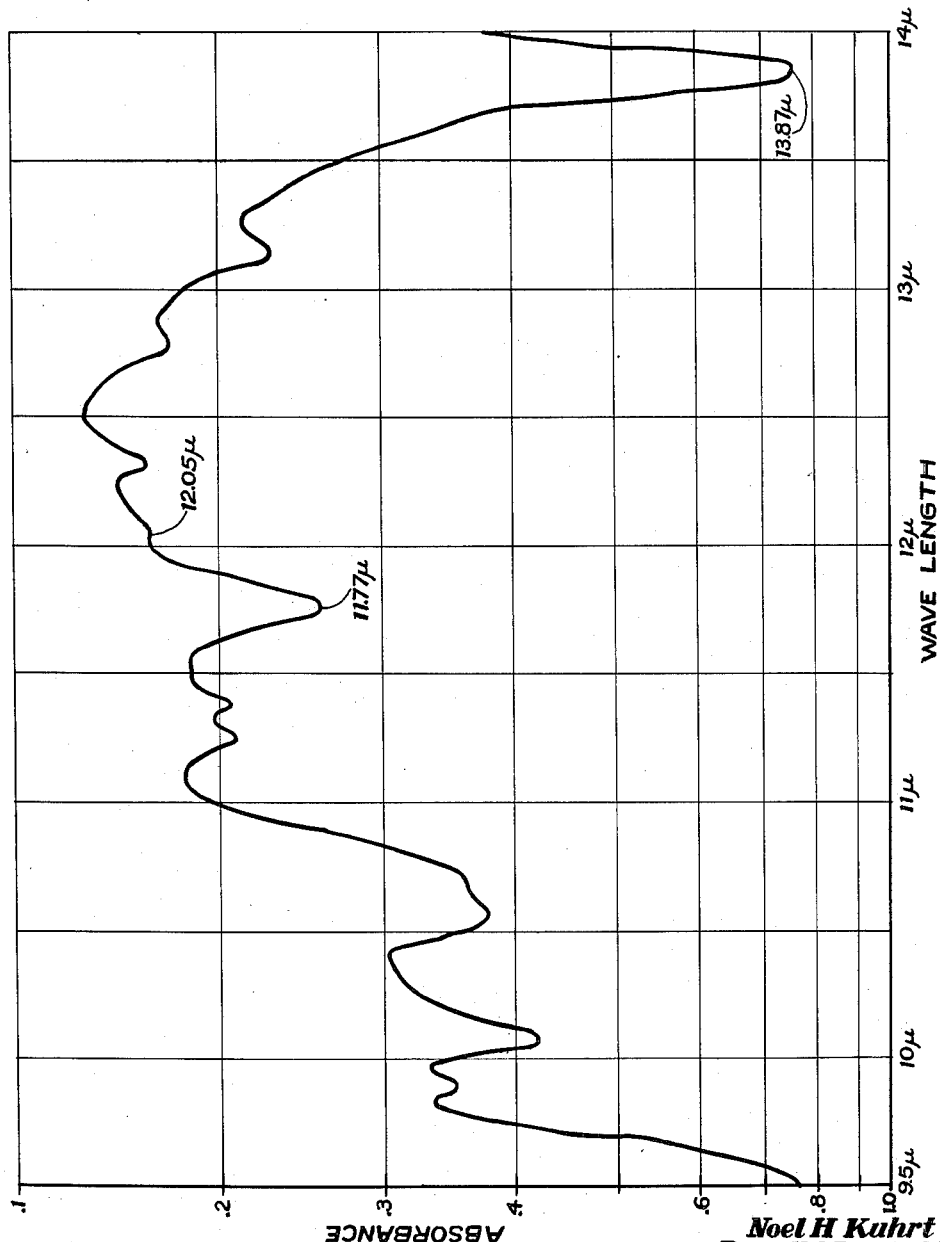
Noel H. Kuhrt
Russell A. Broxholm
INVENTORS 3,034,898
MIXED PARTIAL ESTER COMPOSITIONS
Noel H. Kuhrt and Russell A. Broxholm, Rochester, N.Y., assignors to Eastman Kodak Company, Rochester, N.Y., a corporation of New Jersey
Filed Dec. 9, 1960, Ser. No. 74,812
21 Claims. (Cl. 99—91)

Monoglycerides are widely used as emulsifying agents, particularly in preparing bakery products. Monoglycerides, like other glycerides, can exist in various polymorphic forms. When monoglycerides are solidified from the molten state in the preparation thereof, a substantial amount of the monoglyceride is present as the alpha polymorphic crystalline form. The alpha polymorphic crystalline form is thermodynamically unstable and in a relatively short period of time normally converts on standing to the thermodynamically stable beta polymorphic crystalline form. Hence, commercial monoglyceride compositions are normally in the stable beta polymorphic crystalline form when delivered to the users thereof, such as the baking industry.

Monoglycerides in the normally unstable alpha polymorphic crystalline form have been found to be substantially more water dispersible and useful in preparing bakery products than the normally stable beta polymorphic crystalline form. Such properties as improved texture, volume and grain in cakes, and extended periods of softness in bread, as well as other improved properties, result when the monoglyceride is in the normally unstable alpha polymorphic crystalline form. Hence, it is desirable in the baking art to have a monoglyceride composition that has a substantial amount of the monoglyceride in the desirable alpha polymorphic crystalline form, and which monoglyceride retains this alpha polymorphic crystalline for substantial periods of time.

It is an object of this invention to provide novel partial ester compositions containing monoglycerides wherein the monoglycerides are in a normally unstable polymorphic form.

It is another object of this invention to provide novel partial ester compositions containing monoglycerides in the alpha polymorphic crystalline form, and which alpha polymorphic crystalline form is retained for substantial periods of time.

It is another object of this invention to provide new aqueous dispersions of monoglycerides wherein the monoglycerides have substantial alpha crystal stability.

It is another object of this invention to provide new aqueous dispersions containing monoglycerides in a normally unstable polymorphic crystalline form inhibited against mold formation.

It is another object of this invention to provide novel partial ester compositions useful as emulsifiers for preparing yeast-raised bakery products.

It is still another object of this invention to provide novel partial ester compositions useful as emulsifiers for preparing foam-type cakes.

It is likewise another object of this invention to provide novel partial ester compositions useful as emulsifiers for preparing triglyceride-containing cakes.

Other objects of the invention will be apparent from the description and claims which follow.

The present invention concerns partial ester compositions comprising mixtures of fatty acid monoesters of glycerol and fatty acid monoesters of 1,2-propanediol wherein a substantial portion of the fatty acid monoesters of glycerol are in a normally unstable polymorphic crystalline form.

The partial ester compositions of the invention are comprised predominately of fatty acid monoesters of glycerol and fatty acid monoesters of 1,2-propanediol. The subject partial ester compositions contain 35 to 60 mole percent of monoesters of glycerol and 40 to 65 mole percent of the monoesters of 1,2-propanediol, with substantially equal mole proportions being preferred.

The fatty acid moieties of the partial esters of the invention consist essentially of saturated fatty acid moieties having 16 to 20 carbon atoms, and include palmitoyl, stearoyl and arachidonyl radicals. Partial esters consisting essentially of palmitoyl and stearoyl moieties are preferred. At least 75, and preferably 90, mole percent of the fatty acid moieties of the monoesters of glycerol are the same as the fatty acid moieties of the monoesters of 1,2-propanediol in the present partial ester compositions. The fatty acid moieties of the present partial esters can be those of hydrogenated fats and oils. The fatty acid moieties of many well-known fatty materials consist essentially of mixtures of palmitoyl and stearoyl radicals, or such fatty acid moieties as palmitoleoyl, oleoyl, linoleoyl, and linolenoyl radicals which can be converted by hydrogenation into palmitoyl or stearoyl radicals or mixtures thereof. Fatty acid moieties derived from such hydrogenated fats and oils as lard, soybean oil, cottonseed oil, peanut oil, palm oil, olive oil, beef tallow and others can comprise the fatty acid portion of the partial esters of the invention.

Substantial proportions of the partial esters of glycerol in the present compositions are in a thermodynamically normally unstable alpha polymorphic crystalline form. The partial esters of 1,2-propanediol in the present compositions change from the alpha polymorphic form to the beta prime ($\beta'$) polymorphic form shortly after being solidified or crystallized, and in which form they exhibit substantial stability. The polymorphic crystalline form of the present partial esters can be determined from X-ray diffraction patterns or tracings and infrared curves thereof. The partial esters of glycerol in the present compositions retain the alpha polymorphic crystalline form for extended periods of time, sufficient alpha crystalline stability being exhibited to afford users of these compositions such as bakers the benefits from the added activity of monoglycerides in the alpha polymorphic crystalline form. Normally, monoglycerides convert readily on standing to the less active and thermodynamically stable beta polymorphic crystalline form.

The present partial ester compositions are prepared by rapidly solidifying or crystallizing from the molten state the above-described mixtures of fatty acid monoesters of glycerol and 1,2-propanediol. A rapid solidification of the partial esters is used so that a substantially concurrent solidification or crystallization of the monoester of glycerol and the monoester of 1,2-propanediol is effected. Suitable rapid solidification methods include the well-known spray-chilling methods wherein powdered or beaded products result. The powdered products usually having mesh sizes smaller than about 20 and preferably less than about 100. The partial ester compositions of the invention can also be prepared by solidifying melts thereof in warm water as described below. The present mixtures of partial esters are close associations of two crystalline compounds, namely, the crystals of the partial esters of glycerol and the crystals of the partial esters of 1,2-propanediol. We have coined the name "conjoined crystals" for the present crystalline partial ester mixtures.

The partial ester compositions of the invention have substantial alpha crystal stability. The presence of substantial amounts of unsaturated fatty acid esters reduces such alpha crystal stability. The fatty acid moieties comprising the present partial ester compositions generally are composed of less than 5 mole percent of unsaturated fatty acid moieties, and preferably are substantially completely saturated. The present partial ester compositions thus have low iodine values. Similarly, alpha crystal stability is reduced if the fatty acid moieties of the glycerol partial ester and the fatty acid moieties of the 1,2-propanediol partial ester are substantially different. The partial ester compositions of the invention desirably have at least 75, and preferably 90, mole percent of the same fatty acid moieties on each of the partial esters of the present compositions as described above.

To further illustrate the specificity of the components comprising the present partial ester compositions, substitution of closely related ethylene glycol, 1,3-propanediol or 2,3-butanediol for the 1,2-propanediol in preparing the fatty acid partial ester of 1,2-propanediol component of the invention, results in a product having a substantially more rapid alpha to beta crystal shift than the present partial ester compositions.

Aqueous dispersions of the present partial ester compositions have even further extended alpha crystal stability. Generally such aqueous dispersions are prepared to contain about 30% to 70%, and preferably about 45% to 60%, by weight of water based on the dispersion to form dispersions having a paste-like consistency, although the amount of water used can be widely varied. Such aqueous dispersions can be prepared by dispersing in water the present partial ester compositions in powder form, or by dispersing a molten mixture of the present partial ester compositions directly in water. By the latter method, the water is desirably first warmed to a temperature of from about 30° C. up to the melting point of the partial ester composition. The resulting aqueous dispersion can then be allowed to cool with agitation to ambient storage or shipping temperatures, "Votating" such as described in United States Patents 2,063,065 and 2,063,066 being a particularly useful cooling and agitating method.

Sorbic acid is preferably added as a mold inhibitor to aqueous dispersions of the present conjoined crystals. We have found that sorbic acid not only functions as a mold inhibitor but also serves to impart improved properties to the compositions of the invention not imparted by other common mold inhibitors such as sodium propionate. For example, foam-type cakes such as sponge cakes have improved volume and grain when baked with the present conjoined crystal compositions of the invention containing sorbic acid. Sorbic acid is particularly useful when cationic matter such as residual catalyst materials are present in the present partial ester compositions. In addition to sorbic acid and sodium propionate, other well-known mold inhibitors can be utilized in the partial ester compositions of the invention including propionic acid, lactic acid, benzoic acid, butyric acid, and sodium, potassium or calcium seals thereof, as well as sodium diacetate and others.

The fatty acid partial esters of glycerol and 1,2-propanediol can be prepared separately and then admixed to prepare the present mixtures of the invention. Likewise, such mixtures can be prepared by interesterifying a triglyceride having suitable fatty acid moieties, or free fatty acids, with glycerol and 1,2-propanediol and thereafter separating out a suitable partial ester composition.

The monoglyceride portion of the present partial ester compositions can be prepared by reacting a suitable triglyceride such as tristearin, or a suitable fatty acid such as stearic acid, or a fatty acid ester of a lower monohydric alcohol such as methyl stearate, with glycerine in the presence of an alcoholysis catalyst, and thereafter separating a purified and concentrated monoglyceride portion by thin film, high vacuum distillation, or by any other suitable separating techniques. The preparation of high purity monoglycerides by thin film, high vacuum distillation is described in United States Patents 2,634,234, 2,634,278 and 2,634,279. By substituting 1,2-propanediol for the glycerol in the reaction with the fatty acid, the monoesters of 1,2-propanediol used in the invention can be similarly prepared, camphorsulfonic acids being particularly effective catalysts. The partial esters employed in preparing the present conjoined crystals are preferably high purity materials being at least about 90% monoester such as are prepared by thin film high vacuum distillation, mixtures of mono- and diesters showing a relatively more rapid alpha to beta crystal shift.

In accordance with usual practice, we prefer to utilize antioxidants or stabilizers in our conjoined crystal compositions, including such antioxidants as 2,6-ditertiary-butyl-4-methylphenol, butylated hydroxyanisole and mixtures thereof, tocopherol, and other well-known antioxidants for fat or oleaginous materials. Mixtures of glycine and phosphoric acid, such as are described in United States Patent 2,701,769, are particularly effective.

The present partial ester compositions have considerable utility in the baking art as the monoglycerides therein retain a desired alpha polymorphic crystalline form for substantial periods. Bread prepared with the present partial ester compositions has extended shelf-life. Likewise, cakes have improved texture, volume and grain when prepared with the partial esters of the invention. In addition, the partial ester of 1,2-propanediol is a good emulsifier and supplements the monoglyceride portion of the present conjoined crystals. The partial ester compositions of the invention while being useful emulsifiers are also fully edible and wholesome and contribute nutritionally to foods to which they are added.

The invention is further illustrated by the following examples of preferred embodiments thereof.

EXAMPLE 1

One thousand one hundred and sixty grams of fully hydrogenated lard flakes, 244 grams of glycerol and 304 grams of 1,2-propanediol and 1.7 grams of strontium hydroxide were reacted for two hours at 250° C. The reaction product was distilled in a molecular centrifugal still. The excess propylene glycol and glycerol were removed by stripping and a mixed 1,2-propanediol monoester-glycerol monoester was distilled between 90° and 130° C. and at a pressure of 20μ. The distillate, amounting to 35% of the reaction product, had a composition of 0.43 mole of glycerol monoester and 0.57 mole of 1,2-propanediol monoester. Three hundred and twelve grams of this distillate and .02% glycine in a 4% glycerol solution and .02% phosphoric acid in a 33% glycerol solution were heated to 85° C. and spray chilled through a spray head of the type used to spray paint (De Vilbiss spray gun) into an open-head container at room temperature to produce a finely powdered, free-flowing product having a mesh size smaller than 100 mesh. Only 4% of the glycerol monoester in the finely powdered product was in the beta crystal form with the remainder in the alpha crystal form as determined by infrared analysis. The finely powdered product was readily dispersible in room temperature water.

EXAMPLE 2

Methyl stearate was prepared and fractionally distilled to obtain pure methyl stearate. A purified glycerol monostearate was prepared in the following manner: 575 grams of methyl stearate, 236 grams of C.P. glycerol, and 0.8 gram strontium hydroxide were heated at 250° C. for 4 hours under nitrogen. Excess glycerol was removed and the reaction product distilled in a molecular centrifugal still at a temperature of 130–140° C. at 10μ pressure. The distilled product analyzed 88% 1-monoglyceride which was further purified to 99% 1-monoester by recrystallization from five volumes of 95% petroleum ether boiling 30°–60° C. ("Skellysolve F") and 5% ethyl alcohol at room temperature. A substantially pure 1,2-propanediol monostearate was prepared in the following manner: The purified methyl stearate was saponified and acidified to yield pure stearic acid. 258 grams of the stearic acid, 206 grams of 1,2-propanediol and 0.5 gram of calcium oxide were heated at 175° C. for 10 hours under nitrogen. A 20% solution of the reaction product in diethyl ether was water washed to remove free 1,2-propanediol. The ether-free, washed product was distilled in a molecular centrifugal still at a temperature of 102° C. at 11μ pressure to give a 75% yield of substantially pure (99.6%) 1,2-propanediol monostearate. Thereafter 195 grams of the 1,2-propanediol monostearate and 204 grams of the glycerol monostearate (1:1 mole ratio) were heated to 80° C. and spray chilled into powder form as described in Example 1. The finely powdered product had a melting point of 61–62.5° C. and 14% of the glycerol monostearate was in the beta crystal form with the remainder in the alpha crystal form as determined by infrared analysis. After two months' storage at room temperature, the melting point of the powdered product had not changed, indicating no change in the alpha crystal form of the glycerol monostearate. After storage for 24 months at room temperature, the beta crystal form of the glycerol monostearate had increased to only 30%. The beta crystal form of the glycerol monostearate was determined by infrared analysis. The spray chilled powder when freshly made and after two years' storage at room temperature was readily dispersible in water at room temperature. Powder prepared by spray chilling the glycerol monostearate alone is substantially completely converted to the beta crystal form in less than 24 hours.

EXAMPLE 3

Monoesters of 1,2-propanediol were prepared by reacting 882 grams of hydrogenated soy flakes (I.V.=1), 182 grams of 1,2-propanediol and 1 gram of strontium hydroxide at a reflux temperature of 187° C. to 220° C. for 3 hours. Excess 1,2-propanediol was removed by water washing a diethyl ether solution of the product. About 960 grams of washed product were obtained analyzing for 16% 1-monoglyceride (from the glycerol of the fat). The washed product was distilled in a molecular centrifugal still at a temperature of 108° C. and 14μ pressure. The distillate fraction analyzed 8% 1-monoglyceride and 92% 1,2-propanediol monoester. A blend was made of 279.4 grams of the above product and 228.6 grams of a commercial distilled monoglyceride having the fatty acid moieties of hydrogenated soybean oil and a monoester content of about 95%. This mixture of partial esters comprised 48 mole percent glycerol monoester, 51 mole percent propylene glycol monoester, and 1 mole percent glycerol diesters. The stabilizer, .02% glycine in a 4% glycerol solution and .02% phophoric acid in a 33% glycerol solution, was added to the partial ester blend. The blend was heated to 90° C. and spray chilled into powder form as described in Example 1. The resulting finely powdered product had a melting point of 55.5–60.5° C. and 6% of the glycerol monoester was in the beta crystal form, the remainder in the alpha crystal form as determined by infrared analysis. The beta crystal form of the glycerol monoester after storage at room temperature for six months was 11%, for twelve months was 25% and for eighteen months was 26%. The spray chilled powder when freshly made and after eighteen months' storage at room temperature was readily dispersible in water at room temperature.

EXAMPLE 4

Monoesters of 1,2-propanediol were prepared by reacting 555 grams of a commercial stearic acid ("Hystrene S–97," containing 90% stearic acid and 10% palmitic acid), 445 grams of 1,2-propanediol and 1 gram of calcium oxide at 173° C. for 16 hours. Eight hundred grams of the reaction product were charged to a centrifugal molecular still. Unreacted 1,2-propanediol was removed at a 1 mm. pressure. A high vacuum of 9μ was obtained and the 1,2-propanediol monoester distilled at 92° C. A blend was made of 195 grams of the above product and 195 grams of a commercial distilled monoglyceride having the fatty acid moieties of hydrogenated soybean oil and a monoester content of about 95%. This mixture of partial esters comprised 48 mole percent of glycerol monoester and 52 mole percent of 1,2-propanediol monoester. The stabilizer, .02% glycine in a 4% glycerol solution and .02% phosphoric acid in a 33% glycerol solution, was added to the partial ester blend. The blend was heated to 85° C. and spray chilled into finely divided powder as described in Example 1. The finely powdered product had a melting point of 58–60.5° C. and 4% of the glycerol monoester was in the beta crystal form with the remainder in the alpha crystal form as determined by infrared analysis. The beta crystal form of the glycerol monoester after storage at room temperature for six months was 20%, for twelve months was 26% and for eighteen months was 27%. The spray chilled powder when freshly made and after eighteen months' storage at room temperature was readily dispersible in room temperature water.

EXAMPLE 5

Monoesters of 1,2-propanediol were prepared by reacting 500 grams of a commercial stearic acid ("Hystrene S–97," containing 90% stearic acid and 10% palmitic acid), 402 grams of 1,2-propanediol (2 mole excess) and 0.5 gram of p-toluene sulfonic acid at 120° C. for 5 hours. A 819 gram portion of the resulting reaction product was dissolved in 5 parts of diethyl ether and water-washed to remove excess 1,2-propanediol and catalyst, dried and recovered free of solvent. The washed product analyzed 83% 1,2-propanediol monoester. This washed product was then distilled in a centrifugal molecular still at 95° C. to 105° C. at 6μ. The purity of the resulting distilled product was 90.3% 1,2-propanediol monoester and 9.7% 1,2-propanediol diester. A blend of 100 grams of the distilled 1,2-propanediol ester product and 100 grams of a commercial mono-diglyceride mixture of saturated fatty acids ("Atmul 124," containing 58.5% 1-monoglycerides) was prepared. The partial ester blend comprised 32.8 mole percent 1-monoglycerides, 1.2 mole percent 2-monoglycerides, 11.9 mole percent diglycerides, 51.0 mole percent 1,2-propanediol monostearate and 3.1 mole percent 1,2-propanediol distearate. The stabilizer, .02% glycine in a 4% glycerol solution and .02% phosphoric acid in a 33% glycerol solution, was added to the partial ester blend. The blend was heated to 80° C. and spray chilled into a finely powdered product as described in Example 1. The finely powdered product had a melting point of 52°–55.5° C. and 7% of the glycerol monoester was in the beta crystal form with the remainder in the alpha crystal form as determined by infrared analysis. The beta crystal form of the glycerol monoester after storage at room temperature for six months was 14% and for eight months was 27%.

In Tables Ia and Ib below are summarized the results of the alpha crystal stability of several conjoined crystal compositions of the invention and several other closely related compositions. The various partial ester compositions were high purity compositions prepared by high vacuum, molecular distillation and then sprayed into powder as described in Example 1 above. The percent beta crystal content set out in Table Ib was determnied from infrared curves of the various compositions. The compositions of the various partial ester compositions are set out in Table Ia and the alpha crystal stabilities of the various partial ester compositions are set out in Table Ib.

Table Ia

COMPOSITION, MOLE PERCENT

| Example | Fatty acid moiety | Glycerol esters | | Fatty acid moiety | Glycol esters [1] | |
|---|---|---|---|---|---|---|
| | | Mono-ester | Diester | | Mono-ester | Diester |
| 6 | Stearoyl | 49.2 | 0.5 | Stearoyl | 50.2 | 0.1 |
| 7 | Hydrogenated lard | 43.5 | 1.0 | ....do | 53.7 | 2.0 |
| 8 | Hydrogenated soybean oil | 47.1 | 1.2 | Hydrogenated soybean oil | 51.7 | 0 |
| 9 | ....do | 38.2 | 1.4 | Stearoyl | 55.8 | 4.6 |
| 10 | Palmitoyl | 45.8 | 1.8 | ....do | 50.3 | 2.0 |
| 11 | Hydrogenated lard | 47.8 | 1.8 | ....do | 49.2 | 1.3 |

[1] In Examples 6 to 10 the glycol was 1,2-propanediol and in Example 11 the glycol was 1,3-propanediol.

Table Ib

PERCENT BETA CRYSTAL CONTENT OF GLYCEROL MONOESTER

[Room temperature storage in months]

| Example | 1 | 2 | 3 | 4 | 5 | 6 | 7 | 8 | 9 | 10 | 11 | 12 | 17 | 19 | 21 |
|---|---|---|---|---|---|---|---|---|---|---|---|---|---|---|---|
| 6 | 10 | | | | 10 | | | | | 15 | | | | 20 | 25 |
| 7 | 22 | | | | | | 62 | | | | | | | | |
| 8 | 9 | | | | 14 | | | | 21 | | | | 26 | | |
| 9 | 2 | | | | 7 | | | | | 9 | | | | 15 | |
| 10 | 70 | | | | | | | | | | | | | | |
| 11 | 80 | | | | 100 | | | | | | | | | | |

As can be observed from the data summarized in Tables Ia and Ib, the conjoined crystal compositions of the invention as illustrated by Examples 6, 7, 8 and 9, have a relatively slow conversion rate to the beta crystalline polymorphic form. Example 10 illustrates the increased rate of conversion of alpha to beta crystalline form when the fatty acid moiety on the glycerol partial ester is not substantially the same as that on the 1,2-propanediol partial ester. Example 11 points up the specificity of the 1,2-propanediol partial esters in preparing the present conjoined crystal compositions, the closely related 1,3-propanediol partial esters not being as effective in retarding the normal alpha to beta crystal shift. If the monoglycerides described in Examples 6 to 11 were prepared and sprayed into powder form from melts thereof in the absence of the 1,2-propanediol partial esters, such monoglycerides would be substantially completely in the beta crystalline polymorphic form within 24 hours. The conjoined crystal compositions of the invention retain the alpha crystalline polymorphic form for months as described above.

The partial ester compositions of the invention are prepared from saturated fatty acids, the presence of unsaturated fatty acid moieties substantially increasing the alpha to beta crystal shift on storage. Several high purity partial ester compositions having various iodine values were prepared by high vacuum molecular distillation and then spray chilled into powder as described in Example 1. The alpha crystalline stability of the various compositions is summarized by the data set out in Table II below. Glycerol and 1,2-propanediol monoesters with various iodine values were prepared from mixtures of fatty acids similar to those present in partially hydrogenated soybean oil. For glycerol and 1,2-propanediol monoesters with lower iodine values, the partial esters were diluted with partial esters prepared from fully hydrogenated soybean oil or 1,2-propanediol monostearate. In addition, the various partial ester compositions were tested for alpha crystal stability when dispersed in water at a concentration of 40% by weight based on the aqueous dispersion. Those compositions that were tested as aqueous dispersions are indicated as "(aqueous)" in Table II. The percent beta crystal content set out in Table II was determined from infrared curves of the various compositions.

Table II

| Example | Iodine value | | Percent beta crystal content | | | | | |
|---|---|---|---|---|---|---|---|---|
| | Glycerol monoester | 1,2-propanediol monoester | 4 days | 1 week | 2 weeks | 3 weeks | 1 month | 19 months |
| 12 | 0.9 | 0 | | 7 | | 10 | 12 | 27 |
| 13 (aqueous) | 0.9 | 0 | | | | | | 6 |
| 14 | 0.9 | 0.9 | | 8 | 8 | 8 | 9 | 26 |
| 15 (aqueous) | 0.9 | 0.9 | | | | | | 0 |
| 16 | 5 | 0 | | 20 | | | 48 | |
| 17 (aqueous) | 5 | 0 | | 6 | | 6 | | |
| 18 | 0.9 | 5 | | 31 | | 36 | | |
| 19 (aqueous) | 0.9 | 5 | | 18 | | 40 | | |
| 20 | 5 | 5 | | 40 | | 65 | | |
| 21 (aqueous) | 5 | 5 | | 9 | | 35 | | |
| 22 | 15 | 0 | 35 | | | | | |
| 23 (aqueous) | 15 | 0 | | 6 | 8 | | 55 | |
| 24 | 0.9 | 15 | 69 | | | | | |
| 25 (aqueous) | 0.9 | 15 | | 54 | 61 | | | |
| 26 | 15 | 15 | 80 | | | | | |
| 27 (aqueous) | 15 | 15 | | 65 | | | | | which was further purified to 99% 1-monoester by recrystallization from five volumes of 95% petroleum ether boiling 30°–60° C. ("Skellysolve F") and 5% ethyl alcohol at room temperature. A substantially pure 1,2-propanediol monostearate was prepared in the following manner: The purified methyl stearate was saponified and acidified to yield pure stearic acid. 258 grams of the stearic acid, 206 grams of 1,2-propanediol and 0.5 gram of calcium oxide were heated at 175° C. for 10 hours under nitrogen. A 20% solution of the reaction product in diethyl ether was water washed to remove free 1,2-propanediol. The ether-free, washed product was distilled in a molecular centrifugal still at a temperature of 102° C. at 11µ pressure to give a 75% yield of substantially pure (99.6%) 1,2-propanediol monostearate. Thereafter 195 grams of the 1,2-propanediol monostearate and 204 grams of the glycerol monostearate (1:1 mole ratio) were heated to 80° C. and spray chilled into powder form as described in Example 1. The finely powdered product had a melting point of 61–62.5° C. and 14% of the glycerol monostearate was in the beta crystal form with the remainder in the alpha crystal form as determined by infrared analysis. After two months' storage at room temperature, the melting point of the powdered product had not changed, indicating no change in the alpha crystal form of the glycerol monostearate. After storage for 24 months at room temperature, the beta crystal form of the glycerol monostearate had increased to only 30%. The beta crystal form of the glycerol monostearate was determined by infrared analysis. The spray chilled powder when freshly made and after two years' storage at room temperature was readily dispersible in water at room temperature. Powder prepared by spray chilling the glycerol monostearate alone is substantially completely converted to the beta crystal form in less than 24 hours.

EXAMPLE 3

Monoesters of 1,2-propanediol were prepared by reacting 882 grams of hydrogenated soy flakes (I.V.=1), 182 grams of 1,2-propanediol and 1 gram of strontium hydroxide at a reflux temperature of 187° C. to 220° C. for 3 hours. Excess 1,2-propanediol was removed by water washing a diethyl ether solution of the product. About 960 grams of washed product were obtained analyzing for 16% 1-monoglyceride (from the glycerol of the fat). The washed product was distilled in a molecular centrifugal still at a temperature of 108° C. and 14µ pressure. The distillate fraction analyzed 8% 1-monoglyceride and 92% 1,2-propanediol monoester. A blend was made of 279.4 grams of the above product and 228.6 grams of a commercial distilled monoglyceride having the fatty acid moieties of hydrogenated soybean oil and a monoester content of about 95%. This mixture of partial esters comprised 48 mole percent glycerol monoester, 51 mole percent propylene glycol monoester, and 1 mole percent glycerol diesters. The stabilizer, .02% glycine in a 4% glycerol solution and .02% phophoric acid in a 33% glycerol solution, was added to the partial ester blend. The blend was heated to 90° C. and spray chilled into powder form as described in Example 1. The resulting finely powdered product had a melting point of 55.5–60.5° C. and 6% of the glycerol monoester was in the beta crystal form, the remainder in the alpha crystal form as determined by infrared analysis. The beta crystal form of the glycerol monoester after storage at room temperature for six months was 11%, for twelve months was 25% and for eighteen months was 26%. The spray chilled powder when freshly made and after eighteen months' storage at room temperature was readily dispersible in water at room temperature.

EXAMPLE 4

Monoesters of 1,2-propanediol were prepared by reacting 555 grams of a commercial stearic acid ("Hystrene S-97," containing 90% stearic acid and 10% palmitic acid), 445 grams of 1,2-propanediol and 1 gram of calcium oxide at 173° C. for 16 hours. Eight hundred grams of the reaction product were charged to a centrifugal molecular still. Unreacted 1,2-propanediol was removed at a 1 mm. pressure. A high vacuum of 9µ was obtained and the 1,2-propanediol monoester distilled at 92° C. A blend was made of 195 grams of the above product and 195 grams of a commercial distilled monoglyceride having the fatty acid moieties of hydrogenated soybean oil and a monoester content of about 95%. This mixture of partial esters comprised 48 mole percent of glycerol monoester and 52 mole percent of 1,2-propanediol monoester. The stabilizer, .02% glycine in a 4% glycerol solution and .02% phosphoric acid in a 33% glycerol solution, was added to the partial ester blend. The blend was heated to 85° C. and spray chilled into finely divided powder as described in Example 1. The finely powdered product had a melting point of 58–60.5° C. and 4% of the glycerol monoester was in the beta crystal form with the remainder in the alpha crystal form as determined by infrared analysis. The beta crystal form of the glycerol monoester after storage at room temperature for six months was 20%, for twelve months was 26% and for eighteen months was 27%. The spray chilled powder when freshly made and after eighteen months' storage at room temperature was readily dispersible in room temperature water.

EXAMPLE 5

Monoesters of 1,2-propanediol were prepared by reacting 500 grams of a commercial stearic acid ("Hystrene S-97," containing 90% stearic acid and 10% palmitic acid), 402 grams of 1,2-propanediol (2 mole excess) and 0.5 gram of p-toluene sulfonic acid at 120° C. for 5 hours. A 819 gram portion of the resulting reaction product was dissolved in 5 parts of diethyl ether and water-washed to remove excess 1,2-propanediol and catalyst, dried and recovered free of solvent. The washed product analyzed 83% 1,2-propanediol monoester. This washed product was then distilled in a centrifugal molecular still at 95° C. to 105° C. at 6µ. The purity of the resulting distilled product was 90.3% 1,2-propanediol monoester and 9.7% 1,2-propanediol diester. A blend of 100 grams of the distilled 1,2-propanediol ester product and 100 grams of a commercial mono-diglyceride mixture of saturated fatty acids ("Atmul 124," containing 58.5% 1-monoglycerides) was prepared. The partial ester blend comprised 32.8 mole percent 1-monoglycerides, 1.2 mole percent 2-monoglycerides, 11.9 mole percent diglycerides, 51.0 mole percent 1,2-propanediol monostearate and 3.1 mole percent 1,2-propanediol distearate. The stabilizer, .02% glycine in a 4% glycerol solution and .02% phosphoric acid in a 33% glycerol solution, was added to the partial ester blend. The blend was heated to 80° C. and spray chilled into a finely powdered product as described in Example 1. The finely powdered product had a melting point of 52°–55.5° C. and 7% of the glycerol monoester was in the beta crystal form with the remainder in the alpha crystal form as determined by infrared analysis. The beta crystal form of the glycerol monoester after storage at room temperature for six months was 14% and for eight months was 27%.

In Tables Ia and Ib below are summarized the results of the alpha crystal stability of several conjoined crystal compositions of the invention and several other closely related compositions. The various partial ester compositions were high purity compositions prepared by high vacuum, molecular distillation and then sprayed into powder as described in Example 1 above. The percent beta crystal content set out in Table Ib was determnied from infrared curves of the various compositions. The compositions of the various partial ester compositions are set out in Table Ia and the alpha crystal stabilities of the various partial ester compositions are set out in Table Ib.

*Table Ia*

COMPOSITION, MOLE PERCENT

| Example | Fatty acid moiety | Glycerol esters | | Fatty acid moiety | Glycol esters [1] | |
|---|---|---|---|---|---|---|
| | | Mono-ester | Diester | | Mono-ester | Diester |
| 6 | Stearoyl | 49.2 | 0.5 | Stearoyl | 50.2 | 0.1 |
| 7 | Hydrogenated lard | 43.5 | 1.0 | ----do---- | 53.7 | 2.0 |
| 8 | Hydrogenated soybean oil | 47.1 | 1.2 | Hydrogenated soybean oil | 51.7 | 0 |
| 9 | ----do---- | 38.2 | 1.4 | Stearoyl | 55.8 | 4.6 |
| 10 | Palmitoyl | 45.8 | 1.8 | ----do---- | 50.3 | 2.0 |
| 11 | Hydrogenated lard | 47.8 | 1.8 | ----do---- | 49.2 | 1.3 |

[1] In Examples 6 to 10 the glycol was 1,2-propanediol and in Example 11 the glycol was 1,3-propanediol.

*Table Ib*

PERCENT BETA CRYSTAL CONTENT OF GLYCEROL MONOESTER

[Room temperature storage in months]

| Example | 1 | 2 | 3 | 4 | 5 | 6 | 7 | 8 | 9 | 10 | 11 | 12 | 17 | 19 | 21 |
|---|---|---|---|---|---|---|---|---|---|---|---|---|---|---|---|
| 6 | 10 | | | | 10 | | | | | 15 | | | | 20 | 25 |
| 7 | 22 | | | | | | 62 | | | | | | | | |
| 8 | 9 | | | | 14 | | | 21 | | | | | 26 | | |
| 9 | 2 | | | | 7 | | | | 9 | | | | 15 | | |
| 10 | 70 | | | | | | | | | | | | | | |
| 11 | 80 | | | | 100 | | | | | | | | | | |

As can be observed from the data summarized in Tables Ia and Ib, the conjoined crystal compositions of the invention as illustrated by Examples 6, 7, 8 and 9, have a relatively slow conversion rate to the beta crystalline polymorphic form. Example 10 illustrates the increased rate of conversion of alpha to beta crystalline form when the fatty acid moiety on the glycerol partial ester is not substantially the same as that on the 1,2-propanediol partial ester. Example 11 points up the specificity of the 1,2-propanediol partial esters in preparing the present conjoined crystal compositions, the closely related 1,3-propanediol partial esters not being as effective in retarding the normal alpha to beta crystal shift. If the monoglycerides described in Examples 6 to 11 were prepared and sprayed into powder form from melts thereof in the absence of the 1,2-propanediol partial esters, such monoglycerides would be substantially completely in the beta crystalline polymorphic form within 24 hours. The conjoined crystal compositions of the invention retain the alpha crystalline polymorphic form for months as described above.

The partial ester compositions of the invention are prepared from saturated fatty acids, the presence of unsaturated fatty acid moieties substantially increasing the alpha to beta crystal shift on storage. Several high purity partial ester compositions having various iodine values were prepared by high vacuum molecular distillation and then spray chilled into powder as described in Example 1. The alpha crystalline stability of the various compositions is summarized by the data set out in Table II below. Glycerol and 1,2-propanediol monoesters with various iodine values were prepared from mixtures of fatty acids similar to those present in partially hydrogenated soybean oil. For glycerol and 1,2-propanediol monoesters with lower iodine values, the partial esters were diluted with partial esters prepared from fully hydrogenated soybean oil or 1,2-propanediol monostearate. In addition, the various partial ester compositions were tested for alpha crystal stability when dispersed in water at a concentration of 40% by weight based on the aqueous dispersion. Those compositions that were tested as aqueous dispersions are indicated as "(aqueous)" in Table II. The percent beta crystal content set out in Table II was determined from infrared curves of the various compositions.

*Table II*

| Example | Iodine value | | Percent beta crystal content | | | | | |
|---|---|---|---|---|---|---|---|---|
| | Glycerol mono-ester | 1,2-propanediol mono-ester | 4 days | 1 week | 2 weeks | 3 weeks | 1 month | 19 months |
| 12 | 0.9 | 0 | | 7 | | | 10 | 12 | 27 |
| 13 (aqueous) | 0.9 | 0 | | | | | | 6 |
| 14 | 0.9 | 0.9 | | 8 | 8 | 8 | 9 | 26 |
| 15 (aqueous) | 0.9 | 0.9 | | | | | | 0 |
| 16 | 5 | 0 | | 20 | | | 48 | |
| 17 (aqueous) | 5 | 0 | | 6 | | 6 | | |
| 18 | 0.9 | 5 | | 31 | | 36 | | |
| 19 (aqueous) | 0.9 | 5 | | 18 | | 40 | | |
| 20 | 5 | 5 | | 40 | | 65 | | |
| 21 (aqueous) | 5 | 5 | | 9 | | 35 | | |
| 22 | 15 | 0 | 35 | | | | | |
| 23 (aqueous) | 15 | 0 | | 6 | 8 | | 55 | |
| 24 | 0.9 | 15 | 69 | | | | | |
| 25 (aqueous) | 0.9 | 15 | | 54 | 61 | | | |
| 26 | 15 | 15 | 80 | | | | | |
| 27 (aqueous) | 15 | 15 | | 65 | | | | |

As can be observed from the data set out in Table II above, the unsaturation of the fatty acid moieties comprising the present partial ester compositions substantially affects the rate of conversion to the beta crystalline polymorphic form. Also, it should be noted that aqueous dispersions of the present partial ester mixtures have even further enhanced stability against alpha to beta crystalline shift.

The conjoined crystal compositions of the invention have considerable utility in preparing bakery products such as bread, sponge cakes, cake mixes and the like. This utility is illustrated by the following examples.

In Examples 28 and 31 below the 2% lard bread referred to has the following formulation:

Bread Formula

| Sponge | Parts by weight | |
|---|---|---|
| Flour | 65 | Mix time: 4½ minutes. |
| Water | 40.5 | Ferment time: 4½ hours at 87° F and 80% humidity. |
| Yeast | 1.75 | |
| Yeast food | 0.5 | |
| Dough: | | |
| Flour | 35 | Mix time: 9½ minutes. |
| Water | 27 | Floor time: 30 minutes. |
| Sugar | 6 | Proof time: 1 hour, 5 minutes at 98° F. and 95% humidity. |
| Salt | 2.25 | Bake time: 20 minutes at 450° F. |
| Milk powder | 4 | |
| Lard | 2.0 | |

The Baker Compressimeter employed to test the softness of the bread was of the type described in *Cereal Laboratory Methods*, fifth edition, 1947, compiled and published by the American Association of Cereal Chemists, pages 162–165.

EXAMPLE 28

(A) A commercial high purity distilled monoglyceride composition having the fatty acid moieties of hydrogenated soybean oil and a monoester content of about 95% was heated to 90° C. and spray chilled into powder form as described in Example 1. The resulting finely powdered product was in the beta crystal form as determined by infrared analysis after 24 hours storage at room temperature. The monoglyceride powder was then added at the dough stage in the above-described 2% lard bread formula at a level of 4 ounces per 100 lbs. of flour. The bread was baked with this formulation, with and without the added monoglyceride. Sample pieces of the bread were then tested for the softness characteristic of fresh bread with a Baker Compressimeter after varying storage times. The results of the test are summarized in Table III set out below.

(B) A purified 1,2-propanediol monostearate was prepared in the following manner: Purified methyl stearate was saponified and acidified to yield pure stearic acid. Then 400 grams of the prepared stearic acid, 321 grams of 1,2-propanediol and .5 gram of calcium hydroxide were heated at 185° C. for 9 hours under an atmosphere of nitrogen. The resulting reaction product was distilled in a molecular still and a fraction taken at 105°–115° C. at 9µ of pressure to give a product analyzing 90.4% monoester and 9.6% diester. The resulting 1,2-propanediol monostearate composition was then heated to 70° C. and spray chilled into powder form as described in Example 1. The finely powdered product had a melting point of 43.5°–45.8° C. and was in the alpha crystal form as determined by infrared analysis. No detectable crystal change occurred for 5 months of storage at room temperature. The prepared 1,2-propanediol monostearate powder in the alpha crystalline form was then added at the dough stage in the 2% lard bread formula set out above at a level of 4 ounces per 100 lbs. of flour. Bread was baked using the 1,2-propanediol monostearate as the emulsifier and was tested for firmness retardation with a Baker Compressimeter. The results are summarized by the data set out in Table III below.

(C) A high purity glycerol monostearate was prepared in the following manner: A 575 gram portion of methyl stearate, a 236 gram portion of glycerol and a .8 gram portion of strontium hydroxide were heated at 250° C. for 4 hours under nitrogen. Unreacted glycerol was distilled off the reaction product and then a fraction taken at 130°–140° C. at 10µ of pressure on a molecular centrifugal still. The distilled product analyzed 88% monoglyceride which was further purified to 99% monoglyceride by recrystallization from 5 volumes of solvent consisting of 95% petroleum ether (boiling 30°–60° C.) and 5% ethyl alcohol at room temperature. A 204 gram portion of the prepared glycerol monostearate and a 195 gram portion of the 1,2-propanediol monostearate prepared as described in Example 28B above (1:1 mole ratio) were combined and heated to 80° C. and spray chilled into powder form as described in Example 1. The resulting finely powdered product had a melting point of 61°–62.5° C., approximately 14% of the glycerol monostearate being in the beta crystal form with the remainder in the alpha crystal form as determined by infrared analysis. After 2 months' storage at room temperature, the melting point of the resulting powered product had not changed, indicating no change in the alpha crystal form of the glycerol monostearate. The finely powdered product was then added as a powder to the sponge at the dough stage in the 2% lard bread formula set out above at a level of 4 ounces per 100 lbs. of flour. The bread was baked and stored and then tested with a Baker Compressimeter as described in Example 28A above. The results of the test are summarized by the data set out in Table III below.

Table III

| Emulsifier additive | Baker compressimeter data—bread aged [1] in hours | | | | | |
|---|---|---|---|---|---|---|
| | 20 | 45 | 72 | 95 | 120 | 145 |
| None | 4.8 | 6.8 | 7.6 | 9.0 | 13.2 | 13.4 |
| (a) 4 oz. glycerol monostearate (derived from hydrogenated soybean oil) | 4.2 | 6.8 | 8.2 | 9.8 | 10.6 | 12.2 |
| (b) 4 oz. 1,2-propanediol monostearate | 3.6 | 3.8 | 6.2 | 6.6 | 9.0 | 10.2 |
| (c) 4 oz. mixture of glycerol monostearate and 1,2-propanediol monostearate | 2.8 | 4.0 | 5.6 | 5.4 | 6.8 | 8.0 |

[1] Wrapped in wax paper and stored at 72° F. and 60% relative humidity.

A firmness unit of more than 7 to 8 is indicative of bread having the firmness characteristic of stale bread. It should be noted that the bread baked with the conjoined crystal composition of the invention retained a softness characteristic of fresh bread substantially longer than the bread baked with the monoester of glycerol or the monoester of 1,2-propanediol.

EXAMPLE 29

Monoesters of 1,2-propanediol were prepared by reacting 1500 grams of a commercial stearic acid ("Hystrene S-97," containing 90% stearic acid and 10% palmitic acid), 500 grams of 1,2-propanediol and 4 grams of d-10 camphorsulfonic acid at 165° C. for 1.5 hours. The reaction product was charged to a centrifugal molecular still and unreacted glycerol removed at a pressure of 1 mm. and at a temperature of 85° C. Thereafter a high purity monoester of 1,2-propanediol was distilled over at a temperature of 105° C. and at a pressure of 10µ. A blend of 98 grams of the resulting monoester and 93.5 grams of a commercial distilled monoglyceride having the fatty acid moieties of hydrogenated soybean oil and a monoester content of about 95% was heated to 85° C. and spray chilled into powder form as described in Example 1. The resulting finely powdered product had a melting point of 56°–57.5° C. and about 3% of the glycerol monoester was in the beta crystal form with the remainder in the alpha crystal form as determined by infrared analysis. The powered monoester mixture was then added as a powder to the sponge in the dough stage in the bread formula set out above at various levels and baked into bread of the 2% lard formula set out above. The bread was then tested for retention of softness characteristic of fresh bread with a Baker Compressimeter. The results of the various tests are summarized by the data set out in Table IV below. The amount of monoglyceride additive in Table IV below is set out in terms of ounces of additive per 100 lbs. of flour in the bread formula.

Table IV

| Emulsifier additive | Baker compressimeter data—bread aged [1] in hours | | | | | |
|---|---|---|---|---|---|---|
| | 20 | 45 | 72 | 95 | 120 | 145 |
| None | 4.6 | 6.4 | 7.8 | 9.2 | 9.4 | 12.0 |
| 3.5 oz. mixture of glycerol monoester and 1,2-propanediol monoester | 3.4 | 3.6 | 5.0 | 5.2 | 6.8 | 8.2 |
| 2.84 oz. mixture of glycerol monoester and 1,2-propanediol monoester | 3.8 | 4.0 | 5.0 | 5.4 | 7.0 | 8.0 |
| 2.13 oz. mixture of glycerol monoester and 1,2-propanediol monoester | 3.2 | 4.0 | 5.2 | 7.2 | 8.2 | 9.4 |
| 1.42 oz. mixture of glycerol monoester and 1,2-propanediol monoester | 3.6 | 4.6 | 5.0 | 7.0 | 8.6 | 9.2 |
| 0.71 oz. mixture of glycerol monoester and 1,2-propanediol monoester | 3.8 | 4.6 | 6.6 | 8.8 | 10.4 | 11.6 |

[1] Wrapped in wax paper and stored at 72° F. and 60% relative humidity.

EXAMPLE 30

A blend of 98 grams of the 1,2-propanediol monoester and 93.5 grams of a commercial distilled monoglyceride product containing the fatty acid moieties of hydrogenated soybean oil and comprising about 95% monoester as described in Example 29 was heated to 85° C. and spray chilled into powder form as described in Example 1. A dispersion was prepared with 2 parts by weight of the freshly spray chilled powder and 3 parts by weight of water at room temperature and were blended to form a smooth paste. This paste was added at levels of 8.9 ounces, 7.1 ounces, 5.3 ounces and 3.5 ounces per 100 lbs. of flour directly to the sponge of the 2% lard bread formula set out above. Bread was prepared with and without the subject emulsifier. The cell structure of the bread baked with the emulsifiers was excellent and exceedingly close grained and exceptionally white in color. The bread was stored at varying lengths of time and tested for retention of softness characteristic of fresh bread with a Baker Compressimeter. The results of the test are summarized by the data set out in Table V below.

Table V

| Emulsifier additive | Baker compressimeter data—bread aged [1] in hours | | | | | |
|---|---|---|---|---|---|---|
| | 20 | 45 | 72 | 95 | 120 | 145 |
| None | 4.6 | 6.4 | 7.8 | 9.2 | 9.4 | 12.0 |
| 8.9 oz. mixture of glycerol monoester and 1,2-propanediol monoester | 2.8 | 3.8 | 4.8 | 5.8 | 7.6 | 8.0 |
| 7.1 oz. mixture of glycerol monoester and 1,2-propanediol monoester | 2.8 | 4.0 | 4.8 | 7.0 | 8.0 | 8.6 |
| 5.3 oz. mixture of glycerol monoester and 1,2-propanediol monoester | 3.0 | 4.4 | 6.8 | 8.2 | 9.4 | 10.0 |
| 3.5 oz. mixture of glycerol monoester and 1,2-propanediol monoester | 4.0 | 5.0 | 7.6 | 8.0 | 9.8 | 11.2 |

[1] Wrapped in wax paper and stored at 72° F. and 60% relative humidity.

EXAMPLE 31

Bread prepared with the 2% lard formula described above was prepared with 7 ounce portions per 100 lbs. of flour of the glycerol monoester and 1,2-propanediol monoester conjoined crystal mixture of the aqueous dispersion described in Example 30 above that was freshly prepared and also with a similar dispersion that was 2 years old. Similar comparative bread samples were prepared with 7 ounces per 100 lbs. of flour of aqueous dispersions of a distilled glycerol monoester having the fatty acid moieties of hydrogenated lard and a monoester content of at least 95% that was fresh and also that was 28 days old. The bread was baked and thereafter tested with a Baker Compressimeter for retention of softness characteristic of fresh bread. The data is summarized in Table VI below.

Table VI

| Emulsifier | Baker compressimeter data—bread aged [1] in hours | | | | | |
|---|---|---|---|---|---|---|
| | 20 | 45 | 72 | 95 | 120 | 145 |
| None | 4.6 | 6.2 | 8.2 | 10.2 | 10.6 | 13.0 |
| 7 oz. aqueous mixture of glycerol monoester and 1,2-propanediol monoester (freshly prepared) | 2.8 | 4.0 | 4.8 | 7.0 | 8.0 | 9.6 |
| 7 oz. aqueous mixture of glycerol monoester and 1,2-propane monoester (2 years old) | 4.2 | 4.8 | 7.0 | 7.4 | 8.6 | |
| 7 oz. aqueous preparation of glycerol monoester (freshly prepared) | 4.0 | 4.4 | 6.2 | 7.4 | 7.6 | 9.2 |
| 7 oz. aqueous preparation of glycerol monoester (28 days old) | 4.0 | 5.2 | 6.2 | 9.4 | 11.0 | 13.8 |

[1] Wrapped in wax paper and stored at 72° F. and 60% relative humidity

As can be observed from the data in Table VI, that while freshly prepared glycerol monoester is effective in retarding firmness in bread, this property deteriorates on standing a relatively short period of time. However, the conjoined crystal composition of the invention retained desirable properties for the 2 year period.

The partial ester compositions of the invention have considerable utility in triglyceride-containing cake mixes as emulsifiers in a dried powder form. We have found that the present partial ester compositions can be incorporated with the other dry ingredients of presently prepared cake mixes and need not be incorporated in the shortening. In Examples 32 and 33 below the cakes were prepared with the following formula

WHITE CAKE MIX FORMULA

| Ingredients: | Percent |
|---|---|
| Flour | 41.5 |
| Sugar, granulated | 43.5 |
| Powdered egg white | 1.8 |
| Salt | 1.2 |
| Baking powder | 2.5 |
| Hydrogenated vegetable oil | 9.5 |
| | 100.0 |

In baking with the above cake formula, 60% by weight of whole milk based on the formula is used. One of the improved features of the partial ester compositions or conjoined crystal compositions of the invention when used as emulsifiers in cake mixes is the ability of such mixes to hold and retain air incorporated in the mixing step as well as the gas released by the baking powder. So substantial an amount of air can be incorporated by mixing cake mixes containing the present partial ester compositions that new types of baking powder which release their carbon dioxide only with heat, or a slower acting baking powder necessary if the batter is to stand before being baked, or if the batter is refrigerated, can be utilized. Likewise, if a cake mix is desired which will not require much mixing to incorporate air but can utilize fully the production of carbon dioxide from the baking powder, the present partial ester compositions are very useful. Cakes prepared with the present partial ester compositions show substantially reduced batter density indicating a satisfactory retention of air and gas, and an improvement in the baked cake texture. Cakes prepared with conventional monoglycerides as emulsifiers show a tendency to lose air and gas with increasing batter densities, and a more open cake texture. Further, cakes prepared with the present partial ester compositions have excellent volume.

EXAMPLE 32

A 98 gram portion of distilled 1,2-propanediol monostearate prepared as described in Example 4 was blended with a 93.5 gram portion of a commercial distilled monoglyceride having the fatty acid moieties of hydrogenated soybean oil and a monoglyceride content of about 95% were heated to 85° C. and spray chilled into powder form as described in Example 1. The finely powdered product had a melting point of 56°–57.5° C., with 3% of the glycerol monoester being in the beta crystal form and the remainder being in the alpha crystal form as determined by infrared analysis. The powdered partial ester mixture was then added to the above cake mix formula at levels of 1% to 4% based on the hydrogenated vegetable oil shortening. Similarly, 1% to 4% portions based on the weight of the hydrogenated vegetable oil shortening of a commercial distilled monoglyceride having the fatty acid moieties of lard and a monoester content of about 95% were incorporated in other samples of the above baking mix. The cakes were than baked in 8 inch layer cake tins, approximately 380 grams of batter in each cake tin for 21 minutes at 350° F. Table VII below summarizes the density and appearance of the batters of the cakes prepared with the various emulsifiers as well as the porosity of the baked cakes. The values indicating porosity in the tables are based on:

"1" being average porosity, "1+" being improved porosity, "1++" being still further improved porosity and "1—" being a less than average porosity. In the tables referring to the appearance of cake batters, the term "sl. curd., sl. thick" refers to a batter that is slightly curdled and slightly thickened, the term "V. sl. curd." refers to a batter that is very slightly curdled, etc.

*Table VII*

| Emulsifier additive | Batter | | Baked cake porosity |
|---|---|---|---|
| | Density | Appearance | |
| 1% mixture of glycerol monoester and 1,2-propanediol monoester | 0.84 | Sl. curd., sl. thick | 1+ |
| 1% monoglyceride | 0.83 | Sl. curd., thick | 1— |
| 3% mixture of glycerol monoester and 1,2-propanediol monoester | 0.78 | ___do___ | 1+ |
| 3% monoglyceride | 0.94 | Smooth, sl. thin | 1 |
| 4% mixture of glycerol monoester and 1,2-propanediol monoester | 0.77 | Smooth, thick | 1++ |
| 4% monoglyceride | 1.0 | Smooth, thin | 1+ |

It is to be observed from the data and information summarized in Table VII, that the conjoined crystal compositions of the invention produce cake batters having lower density and improved cake porosity as compared to conventional monoglyceride compositions.

EXAMPLE 33

The conjoined crystal composition of the invention prepared as described in Example 32 was incorporated at a 5% by weight level based on the hydrogenated vegetable oil shortening in the above cake mix and stored at room temperature for periods up to three months. Cakes were baked periodically with the partial ester mixture-containing mix and were evaluated for batter density and appearance and baked cake porosity and volume. The cake was baked as decribed in Example 32. During the three month period the cake mixes showed good batter density indicating a good retention of air and gas, and an improvement in cake texture and volume. The results of the baking tests are summarized in Table VIII below.

*Table VIII*

| Dry cake mix storage time | Batter | | Baked cake | |
|---|---|---|---|---|
| | Density | Appearance | Porosity | Volume, Ml./lb. batter |
| 0 days | 0.85 | V. sl. curd., good | 1++ | 1,290 |
| 1 week | 0.81 | ___do___ | 1++ | 1,300 |
| 4 weeks | 0.85 | ___do___ | 1++ | 1,300 |
| 7 weeks | 0.85 | ___do___ | 1++ | 1,335 |
| 12 weeks | 0.81 | ___do___ | 1++ | 1,305 |

The partial ester compositions of the invention have utility in foam-type cakes. Foam-type cakes do not contain triglyceride shortenings and when conventional monoglycerides are utilized as emulsifiers in their preparation they tend to break the emulsion formed by the eggs and result in poor cakes. Foam-type cakes are so-called because the "body" of the cake batter as well as the major supporting framework of the baked cake depends on the aeration or beating of the eggs into a "foam-like mass." A commonly used emulsifier for foam-type cakes is an aqueous dispersion of polyoxyethylene partially stearated sorbitol. However, this emulsifier does not contribute a desirable substantial increase in volume. We have found that the partial ester compositions of the invention impart to foam-type cakes when used in their preparation, substantially improved volume as well as improved texture. In Examples 34 and 35 below the following foam-type cake formula was utilized.

SPONGE CAKE FORMULA

| Ingredients: | Percent |
|---|---|
| Water (130° F.) | 43 |
| Sugar | 143 |
| Milk powder | 10.75 |
| Whole eggs | 143 |
| Flour | 100 |
| Baking powder | 1.75 |
| Salt | 1.75 |

EXAMPLE 34

Sponge cakes were baked with .5% by weight based on the flour in the above formula of various emulsifying agents and were observed with respect to improvement of porosity and volume. A conjoined crystal composition of the invention prepared as described in Example 3 was dispersed in 3 parts by weight of water for each 2 parts by weight of conjoined crystal composition and used as the emulsifier in baking the cakes. Similarly, .5% by weight of a similar aqueous dispersion of 1,2-propanediol monostearate, .5% by weight of an aqueous dispersion of monoglyceride containing the fatty acid moieties of hydrogenated lard and having a monoester content of about 95%, and .5% by weight of an aqueous dispersion of polyoxyethylene partially stearated sorbitol ("Vanlite") were employed as emulsifiers in the baking of a foam-type cake with the above formula. The partial ester additives were added at the first stage of the mixing of the water, sugar, milk powder and eggs. The ingredients were then mixed with a wire whip for 5 minutes at high speed. Flour, baking powder and salt were then added and mixing continued for 2 minutes at low speed. The cakes were baked in 8 inch round layer tins containing 200 grams of batter for 17 minutes at 360° F. The results of the comparative baking tests are summarized in Table IX below.

Table IX

| Emulsifier additive | Batter density | Baked cake | |
| --- | --- | --- | --- |
| | | Porosity | Volume, Ml./lb. batter |
| None | 0.69 | 1+ | 1,520 |
| 0.5% aqueous mixture of glycerol monoester and 1, 2-propanediol monoester | 0.46 | 1+++ | 2,300 |
| 0.5% aqueous monoglyceride | 0.53 | 1+ | 2,350 |
| 0.5% aqueous 1, 2-propanediol monoester | 0.39 | 1 | 2,400 |
| 0.5% aqueous polyoxyethylene partially stearated sorbitol in water | 0.58 | 1++ | 1,890 |

It is to be noted from Table IX that the cake baked with the conjoined crystal composition of the invention had good porosity and volume. The batter prepared with the conjoined crystal composition of the invention also had a desirable low density. All three of these properties were not imparted by the monoglyceride alone, the 1,2-propanediol monoester alone, or the sorbitol derivative alone.

EXAMPLE 35

We have found that sorbic acid is an effective mold inhibitor for aqueous dispersions of the present partial ester compositions. In addition, sorbic acid imparts to foam-type cakes improved grain and texture as compared to such other commonly used mold inhibitors as sodium propionate. Sorbic acid in concentrations based on the weight of the cake from about .01% to .5% are suitable, with concentrations of about .2% to .3% being more generally used. A 9.7 gram portion of 1,2-propanediol monostearate and 10.3 grams of a commercial distilled monoglyceride having the fatty acid moieties of hydrogenated lard and a monoester content of 95% were melted together and added with stirring to 30 ml. of warm water containing .05 gram of sorbic acid and a smooth paste was formed. The resulting paste was then added to the batter of the sponge cake formula set out above at a level of .5% by weight based on the flour and mixed and baked as described in Example 34. A sponge cake batter was made without added emulsifier to serve as control. Similarly, a cake batter was prepared substituting .05% sodium propionate for the sorbic acid. The cakes were baked in 8 inch round layer tins containing 200 grams of batter for 17 minutes at 360° F. The baked cake containing the sorbic acid had approximately 1.8 times greater volume than the cake containing no emulsifier. Similar improved volume resulted from the cake baked with the sodium propionate. However, the cake baked with the sorbic acid had good texture while the cake baked with the sodium propionate had a more open texture.

The drawing illustrates a typical infrared curve between $9.5\mu$ and $14\mu$ of a conjoined crystal composition of the invention in a hydrocarbon mineral oil slurry. This curve is representative of the conjoined crystal composition prepared as described in Example 3 having a small amount (about 6%) of monoglyceride in the beta polymorphic crystalline form. The use of infrared analysis to determine the polymorphic crystalline form of monoglycerides was described by Chapman in J. Chem. Soc. 55 (1956) and Colloquium Spectroscopicum Internationale VI (Amsterdam, 1956), Pergamon Press Ltd., London. Monoesters of 1,2-propanediol such as the monostearate ester show very little response at $12.05\mu$ but show a strong peak at $11.77\mu$ in either the alpha or beta polymorphic crystalline form. Glycerol monoesters such as glycerol monostearate also have a strong peak at $11.77\mu$ when in either the alpha or the beta polymorphic crystalline form. However, glycerol monoesters in the beta form also have a peak at $12.05\mu$ not shown by the alpha form. Hence, for mixtures of monoesters of glycerol and 1,2-propanediol the peak at $11.77\mu$ is additive while the peak at $12.05\mu$ is a function only of the glycerol monoester in the beta form. The peak at $12.05\mu$ is thus useful in determining the amount of beta crystals of glycerol monoester in the present mixtures of partial esters. Another peak of interest is at $13.87\mu$ where both monoesters of glycerol and 1,2-propanediol in the alpha form show strong characteristic peaks.

The present invention thus provides novel partial ester compositions. The monoglyceride portions of the present compositions have substantial alpha polymorphic crystalline stability. Such compositions have improved water dispersibility and foaming or frothing properties. Such improved properties lend to the present compositions considerable utility. As described above, the present compositions have utility in the preparation of bakery products. Another use for the present compositions is as whipping or foaming agents for vegetable or fruit puree and the like. For example, small amounts of the present compositions can be utilized to whip applesauce to a high overrun having a stiff texture, and which whipped applesauce can be subjected to foam-mat drying at a faster rate and at a lower temperature than can be utilized with applesauce whipped with conventional monoglyceride whipping agents. The present compositions also have utility in the preparation of whipped dairy products, toppings, confections and the like. Hence, the present invention is a substantial contribution to the art.

Although the invention has been described in detail with particular reference to certain typical embodiments thereof, it will be understood that variations and modifications can be effected within the spirit and scope of the invention as described hereinabove and as defined in the appended claims.

We claim:

1. The process which comprises providing a partial ester composition in the molten state comprised predominately of fatty acid monoesters of glycerol and fatty acid monoesters of 1,2-propanediol, said partial ester composition containing 35 to 60 mole percent of said monoesters of glycerol and 40 to 65 mole percent of said monoesters of 1,2-propanediol, and thereafter rapidly cooling said molten partial ester composition to concurrently solidify said monoesters and forming a solid partial ester composition wherein a substantial portion of said monoesters of glycerol are in a normally unstable polymorphic crystalline form, the fatty acid moieties of said monoesters consisting essentially of saturated fatty acids having 16 to 20 carbon atoms, at least about 75 mole percent of the fatty moieties of said monoesters of glycerol being the same as the fatty acid moieties of said monoesters of 1,2-propanediol, and less than about 5 mole percent of the fatty acid moieties comprising said partial ester composition being unsaturated fatty acid moieties.

2. The process according to claim 1 wherein the fatty acid moieties are palmitoyl moieties.

3. The process according to claim 1 wherein the fatty acid moieties are stearoyl moieties.

4. The process according to claim 1 wherein the fatty acid moieties are mixtures of palmitoyl and stearoyl moieties.

5. The process according to claim 1 wherein the fatty acid moieties are selected from the group consisting of the fatty acid moieties derived from hydrogenated fats and oils having fatty acid moieties consisting essentially of stearoyl and palmitoyl moieties.

6. The process which comprises providing a partial ester composition in the molten state comprised predominately of fatty acid monoesters of glycerol and fatty acid monoesters of 1,2-propanediol, said partial ester composition containing 35 to 60 mole percent of said monoesters of glycerol and 40 to 65 mole percent of said monoesters of 1,2-propanediol, and thereafter spray chilling said molten partial ester composition into a powder wherein said monoesters of glycerol are predominately in the alpha polymorphic crystalline form, the fatty acid moieties of said monoesters consisting essentially of a fatty acid moiety selected from the group consisting of palmitoyl moieties, stearoyl moieties and mixtures of palmitoyl moieties and stearoyl moieties, at least 90 mole percent of the fatty acid moieties of said monoesters of glycerol being the same as the fatty acid moieties of said monoesters of 1,2-propanediol, and the fatty acid moieties comprising said partial ester composition consisting essentially of saturated fatty acid moieties.

7. The process according to claim 6 wherein the monoesters of glycerol and 1,2-propanediol are employed in substantially equal mole proportions.

8. The process according to claim 6 wherein the fatty acid moieties are those of hydrogenated soybean oil.

9. The process according to claim 6 wherein the fatty acid moieties are those of hydrogenated lard.

10. A partial ester composition comprised predominately of concurrently solidified fatty acid monoesters of glycerol and fatty acid monoesters of 1,2-propanediol, said partial ester composition containing 35 to 60 mole percent of said monoesters of glycerol and 40 to 65 mole percent of said monoesters of 1,2-propanediol, a substantial portion of said monoesters of glycerol being in a normally unstable polymorphic form, the fatty acid moieties of said monoesters consisting essentially of saturated fatty acids having 16 to 20 carbon atoms, at least about 75 mole percent of the fatty acid moieties of said monoesters of glycerol being the same as the fatty acid moieties of said monoesters of 1,2-propanediol, and less than about 5 mole percent of the fatty acid moieties comprising said partial ester composition being unsaturated fatty acid moieties.

11. A partial ester composition as defined in claim 10 wherein the fatty acid moieties are palmitoyl moieties.

12. A partial ester composition as defined in claim 10 wherein the fatty acid moieties are stearoyl moieties.

13. A partial ester composition as defined in claim 10 wherein the fatty acid moieties are mixtures of palmitoyl and stearoyl moieties.

14. An aqueous dispersion of the partial ester composition defined in claim 10.

15. A partial ester composition in powder form comprised predominately of concurrently solidified fatty acid monoesters of glycerol and fatty acid monesters of 1,2-propanediol, said partial ester composition containing 35 to 60 mole percent of said monoesters of glycerol and 40 to 60 mole percent of said monoesters of 1,2-propanediol, said monoesters of glycerol being predominately in the alpha polymorphic crystalline form, the fatty acid moieties of said monoesters consisting essentially of a fatty acid moiety selected from the group consisting of palmitoyl moieties, stearoyl moieties and mixtures of palmitoyl moieties and stearoyl moieties, at least 90 mole percent of the fatty acid moieties of said monoesters of glycerol being the same as the fatty acid moieties of said monoesters of 1,2-propanediol, and the fatty acid moieties comprising said partial ester composition consisting essentially of saturated fatty acid moieties.

16. A partial ester composition as defined in claim 15 wherein the monoesters of glycerol and 1,2-propanediol are substantially equal mole proportions.

17. A partial ester composition as defined in claim 15 wherein the fatty acid moieties are those of hydrogenated soybean oil.

18. A partial ester composition as defined in claim 15 wherein the fatty acid moieties are those of hydrogenated lard.

19. An aqueous dispersion of the partial ester composition defined in claim 15 comprising about 30% to 70% by weight of water based on said dispersion.

20. A partial ester composition as defined in claim 15 containing a mixture of glycine and phosphoric acid as an antioxidant.

21. A partial ester composition as defined in claim 15 containing sorbic acid as a mold inhibitor.

No references cited.

UNITED STATES PATENT OFFICE
CERTIFICATE OF CORRECTION

Patent No. 3,034,898                              May 15, 1962

Noel H. Kuhrt et al.

It is hereby certified that error appears in the above numbered patent requiring correction and that the said Letters Patent should read as corrected below.

In the grant, line 1, name of first inventor, for "Noel N. Kuhrt" read -- Noel H. Kuhrt --; column 16, line 49, after "fatty" insert -- acid --; column 18, line 8, for "60" read -- 65 --.

Signed and sealed this 9th day of October 1962.

(SEAL)
Attest:

ERNEST W. SWIDER                              DAVID L. LADD
Attesting Officer                                  Commissioner of Patents